US011368367B2

(12) United States Patent
Baukes et al.

(10) Patent No.: US 11,368,367 B2
(45) Date of Patent: Jun. 21, 2022

(54) DIFFERENTIAL NODE CONFIGURATION FOR NETWORK MAINTENANCE

(71) Applicant: UpGuard, Inc., Mountain View, CA (US)

(72) Inventors: Michael Franz Baukes, Sunnyvale, CA (US); Paul McCarthy, Palo Alto, CA (US); Greg Pollock, San Jose, CA (US); Alan Sharp-Paul, Los Altos, CA (US); Mark Sheahan, Mountain View, CA (US); Taylor Stackpole, Santa Clara, CA (US); Cheyne Wallace, San Francisco, CA (US)

(73) Assignee: UPGUARD, INC., Mountain View, CA (US)

( * ) Notice: Subject to any disclaimer, the term of this patent is extended or adjusted under 35 U.S.C. 154(b) by 0 days.

(21) Appl. No.: 16/919,379

(22) Filed: Jul. 2, 2020

(65) Prior Publication Data

US 2020/0336380 A1 Oct. 22, 2020

Related U.S. Application Data

(63) Continuation of application No. 16/109,304, filed on Aug. 22, 2018, now Pat. No. 10,742,507, which is a
(Continued)

(51) Int. Cl.
*H04L 41/0893* (2022.01)
*H04L 41/142* (2022.01)
(Continued)

(52) U.S. Cl.
CPC ...... *H04L 41/0893* (2013.01); *H04L 41/0853* (2013.01); *H04L 41/0873* (2013.01);
(Continued)

(58) Field of Classification Search
CPC .............. H04L 41/0893; H04L 41/142; H04L 41/0853; H04L 41/0873; H04L 41/22;
(Continued)

(56) References Cited

U.S. PATENT DOCUMENTS 7,441,051 B2 * 10/2008 Brown ................ H04L 41/0866
710/1
7,742,432 B2 * 6/2010 Dominick ............... H04L 41/22
370/254
(Continued)

FOREIGN PATENT DOCUMENTS

WO   WO-2017049439 A1 *  3/2017  .......... G06F 11/3006

OTHER PUBLICATIONS

G. M. Draper, Y. Livnat and R. F. Riesenfeld, "A Survey of Radial Methods for Information Visualization," in IEEE Transactions on Visualization and Computer Graphics, vol. 15, No. 5, pp. 759-776, Sep.-Oct. 2009, doi: 10.1109/TVCG.2009.23. (Year: 2009).*
(Continued)

*Primary Examiner* — Kamal B Divecha
*Assistant Examiner* — Alex H. Tran
(74) *Attorney, Agent, or Firm* — Fenwick & West LLP

(57) ABSTRACT

An operator node is configured to generate a visualization of the configurations of nodes communicatively coupled to the operator node via a network. The operator node scans target nodes in a network and identifies a set of attributes describing various configuration properties of each node. The operator node compares corresponding attributes across nodes and determines for each attribute a measure of variance. The variance for each attribute is displayed in a grid view, allowing a user to observe the level of similarity or dissimilarity of each attribute across the target nodes of the network. The operator node also defines and implements a policy describing a set of configuration properties with
(Continued)

which target nodes must comply. The operator node determines if one or more target nodes is in violation of the policy, displays a differential visualization associated with each policy failure event, and enables an operator to re-configure target nodes accordingly.

20 Claims, 8 Drawing Sheets

Related U.S. Application Data continuation of application No. 14/872,020, filed on Sep. 30, 2015, now Pat. No. 10,084,653.

(51) Int. Cl.
- *H04L 41/0853* (2022.01)
- *H04L 41/0873* (2022.01)
- *H04L 41/22* (2022.01)
- *H04L 41/0816* (2022.01)

(52) U.S. Cl.
CPC ............ *H04L 41/142* (2013.01); *H04L 41/22* (2013.01); *H04L 41/0816* (2013.01)

(58) Field of Classification Search
CPC . H04L 41/0816; H04L 63/20; H04L 41/0803; H04L 41/0866; H04L 41/085; H04L 41/082; H04L 41/0856; H04L 41/0883
See application file for complete search history.

(56) References Cited

U.S. PATENT DOCUMENTS

| | | | |
|---|---|---|---|
| 7,774,445 B1* | 8/2010 | Weinbrecht | H04L 41/0893 709/224 |
| 8,131,992 B2* | 3/2012 | Ennis, Jr | H04L 41/0803 702/182 |
| 8,380,757 B1* | 2/2013 | Bailey | H04L 41/024 717/109 |
| 8,386,593 B1* | 2/2013 | Gao | H04L 41/085 709/224 |
| 8,839,234 B1 | 9/2014 | Voronkov et al. | |
| 9,042,876 B2* | 5/2015 | Buck | H04W 12/126 455/418 |
| 9,596,124 B2* | 3/2017 | Sasaki | H04L 12/40006 |
| 9,621,424 B2 | 4/2017 | Luty | |
| 9,813,292 B2 | 11/2017 | Sharp-Paul et al. | |
| 9,906,399 B2* | 2/2018 | Venkatramanan | H04L 41/022 |
| 10,075,475 B2* | 9/2018 | Carpenter | H04L 63/20 |
| 10,084,653 B2 | 9/2018 | Baukes et al. | |
| 10,425,278 B2 | 9/2019 | Sharp-Paul et al. | |
| 10,742,507 B2 | 8/2020 | Baukes et al. | |
| 2002/0120731 A1 | 8/2002 | Walker et al. | |
| 2003/0231211 A1 | 12/2003 | Shah et al. | |
| 2004/0193703 A1 | 9/2004 | Loewy et al. | |
| 2005/0185597 A1 | 8/2005 | Le et al. | |
| 2006/0179171 A1* | 8/2006 | Stefaniak | H04L 41/22 710/15 |
| 2006/0212924 A1 | 9/2006 | Xie et al. | |
| 2006/0282458 A1 | 12/2006 | Tsyganskiy et al. | |
| 2007/0011283 A1 | 1/2007 | Brown et al. | |
| 2007/0189288 A1 | 8/2007 | Andrews et al. | |
| 2007/0283344 A1 | 12/2007 | Apte et al. | |
| 2008/0028048 A1 | 1/2008 | Shekar Cs et al. | |
| 2009/0055748 A1* | 2/2009 | Dieberger | G06Q 10/00 715/735 |
| 2009/0228953 A1 | 9/2009 | Hu et al. | |
| 2010/0299419 A1 | 11/2010 | Ramankutty et al. | |
| 2011/0004914 A1 | 1/2011 | Ennis et al. | |
| 2011/0055390 A1* | 3/2011 | Malloy | H04L 41/145 709/224 |
| 2011/0191817 A1 | 8/2011 | Oh et al. | |
| 2012/0151326 A1 | 6/2012 | Cross, Jr. et al. | |
| 2012/0191826 A1 | 7/2012 | Gotesdyner et al. | |
| 2013/0086237 A1 | 4/2013 | Cutler et al. | |
| 2013/0246780 A1 | 9/2013 | Wright et al. | |
| 2013/0290791 A1 | 10/2013 | Basile et al. | |
| 2014/0026122 A1 | 1/2014 | Markande et al. | |
| 2014/0046645 A1* | 2/2014 | White | H04L 63/1433 703/13 |
| 2014/0258894 A1* | 9/2014 | Brown | G06F 8/38 715/764 |
| 2014/0280846 A1 | 9/2014 | Gourlay et al. | |
| 2014/0289661 A1 | 9/2014 | Venkatramanan et al. | |
| 2014/0379876 A1 | 12/2014 | Peterson et al. | |
| 2015/0026313 A1 | 1/2015 | Chawla et al. | |
| 2015/0199496 A1 | 7/2015 | Deter et al. | |
| 2016/0099969 A1 | 4/2016 | Angus et al. | |
| 2016/0119204 A1 | 4/2016 | Murasato et al. | |
| 2016/0196131 A1* | 7/2016 | Searle | H04L 67/34 717/173 |
| 2016/0335071 A1 | 11/2016 | Ham et al. | |
| 2017/0078322 A1* | 3/2017 | Seiver | H04L 63/1466 |
| 2017/0093645 A1* | 3/2017 | Zhong | H04L 67/10 |
| 2017/0097621 A1* | 4/2017 | Ackmann | G05B 19/0426 |

OTHER PUBLICATIONS

United States Office Action, U.S. Appl. No. 14/872,020, dated May 1, 2018, 15 pages.
United States Office Action, U.S. Appl. No. 14/872,020, dated Feb. 5, 2018, 15 pages.
United States Office Action, U.S. Appl. No. 14/574,232, dated Feb. 24, 2017, 11 pages.
United States Office Action, U.S. Appl. No. 15/723,961, dated Apr. 18, 2019, 18 pages.
United States Office Action, U.S. Appl. No. 17/132,717, dated Sep. 2, 2021, 24 pages.
United States Office Action, U.S. Appl. No. 17/132,717, dated Oct. 20, 2021, 14 pages.

* cited by examiner

DIFFERENTIAL NODE CONFIGURATION FOR NETWORK MAINTENANCE

CROSS REFERENCE TO RELATED APPLICATIONS

This application is a continuation of U.S. application Ser. No. 16/109,304, filed Aug. 22, 2018, now U.S. Pat. No. 10,742,507, which is a continuation of U.S. application Ser. No. 14/872,020, filed Sep. 30, 2015, now U.S. Pat. No. 10,084,653, all of which are incorporated by reference in their entirety.

FIELD OF ART

This application relates generally to the field of networking, and more specifically to the analysis and visualization of configuration differences between nodes in a network.

BACKGROUND

Many challenges exist in administrating a network of computing systems ("nodes"), particularly networks with hundreds of, thousands of, or more nodes. Complicating network management further is the potentially large variance in node operating systems, hardware configurations, software configurations, networking configurations, and the like. For instance, two nodes in the same network can include different versions of the same program, different programs, different hot fixes, and different operating systems. As used herein, a node's hardware configuration, operating system configuration, software configuration, network configuration, and other properties or characteristics is referred to collectively as a "node configuration" or simply "configuration" herein. Accordingly, installing or configuring an application on different nodes within the network can have different and often unexpected consequences based on the configuration of the nodes. Thus, there is a need for network administrators to view a graphical visualization of the configuration of one or more nodes, as well as a visualization of the differences between nodes configurations.

SUMMARY

A differential visualization is produced for a group or multi-node configuration by the scan engine of an operator node. The scan engine scans one or more target nodes in a network, and identifies a set of attributes for each node. The attributes describe quantitative or qualitative information pertaining to one or more properties of a target node's configuration. In some embodiments, the identified attributes are common to all nodes. Based on attribute information collected from each of the target nodes, the scan engine computes and displays a measure of variance for each of the attributes. Each measure of variance is displayed as a single tile in a grid view on an interface generated and/or displayed by the operator node. Attributes with little to no variance across the target nodes in the network are considered similar; attributes with high variance are considered dissimilar. The level of similarity or dissimilarity for each attribute in the differential view is conveyed using various indicators, such as a range of colors, a range of textures, a range of patterns, a range of shapes, a range of shades of one color, and the like. In some cases, variation of opacity or other color effects are used to provide context. A time-varying differential visualization is also described, in which a user can view a differential visualization for a network of nodes across multiple points in time. The user can drag a slider bar backward and forward in time, and observe how the variance of each attribute changes.

A policy engine in the operator node can define a policy for the target nodes in the network, the policy specifying a set of configuration criteria with which each target node must comply. During performance of scan, the scan engine can compare individual attributes against the policy to determine if for any given node, one or more attributes violate the policy. A policy engine can subsequently determine if the overall severity of individual policy violations is sufficient to be considered a Policy Failure event. A differential visualization associated with a Policy Failure event can be displayed via the interface to the user. The scan engine can also display, via the interface, a differential view for each node, in which attributes for a single node are compared to themselves over time. This allows a user to observe which attributes are experiencing little to no change, and which are experiencing significant change.

An operator, in response to viewing a differential visualization produced by an operator node, can beneficially identify high variance attributes within a set of target nodes, and can re-configure one or more of the target nodes. In some embodiments, for an attribute with a very low variance among a set of nodes, an operator can quickly identify outlier nodes (nodes configured differently than other nodes with respect to the attribute), and can re-configure the identified outlier nodes (either in whole, or with respect to the attribute). Re-configuring target nodes can be performed by the operator via the operator node, for instance by selecting one or more policies or configurations, and by instructing the operator node to re-configure the target nodes according to the selected policies or configurations.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Node Policy Generation and Implementation

Figure 1:
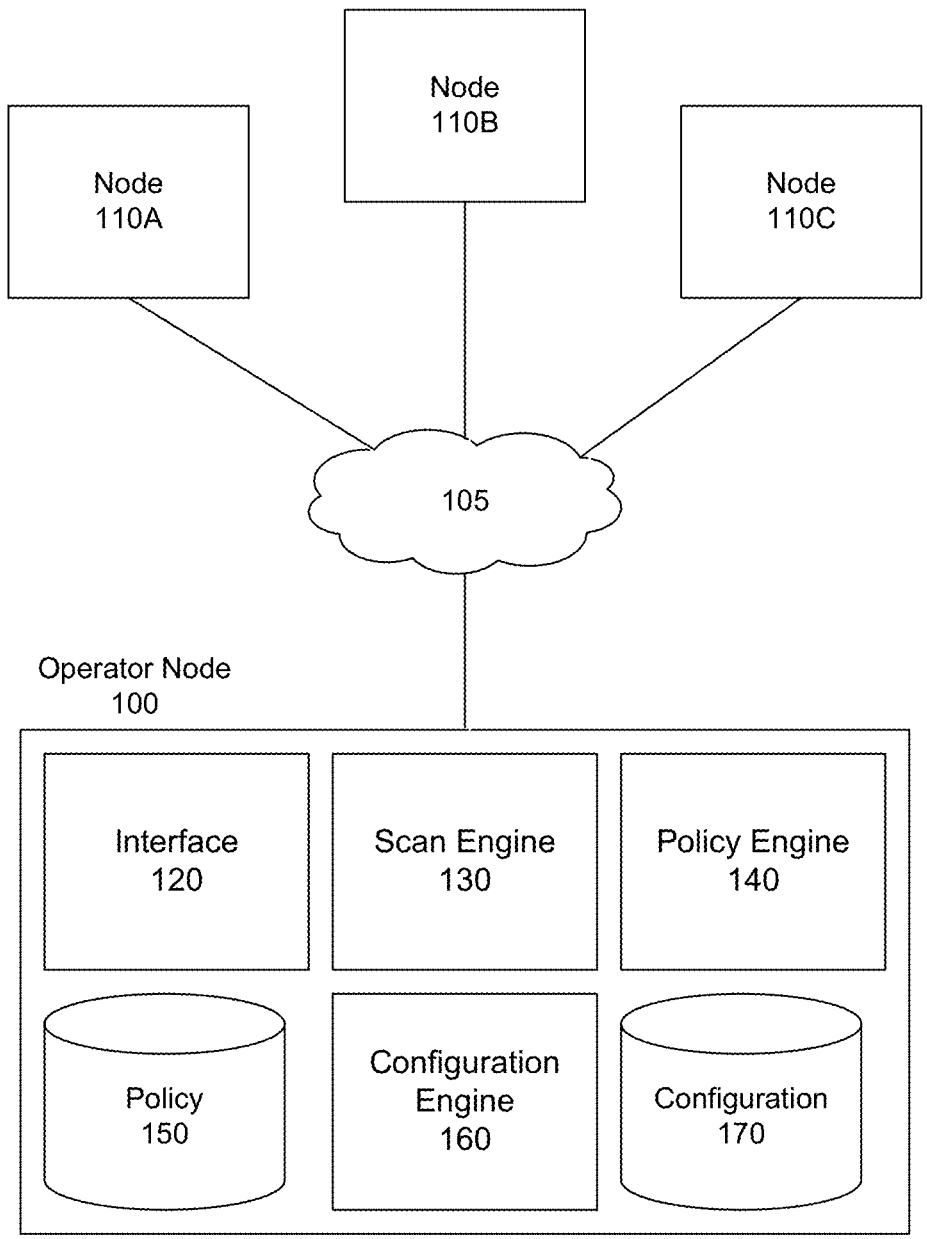
FIG. 1 illustrates a networking environment, according to one embodiment.

FIG. 1 illustrates a networking environment, according to one embodiment. The environment of FIG. 1 includes an operator node 100 and a plurality of additional nodes (nodes 110A, 110B, and 110C) communicatively coupled to the operator node by the network 105. It should be noted that in alternative embodiments, the environment of FIG. 1 can include additional, fewer, or different components than those illustrated in FIG. 1. For instance, alternative embodiments can include any number of nodes (from as few as one node 110 to hundreds or thousands or more nodes). In addition, it should be noted that in some embodiments, the operator node can be configured similarly to or the same as one or more of the nodes 110, but that for the purpose of simplicity, the term "operator node" is used merely to indicate the node from which a node policy is generated or implemented, for instance by a network manager, administrator, or other user, or by an automation application or script (with or without the supervision of a human operator).

Each node 110 is a computing system capable of transmitting or receiving data via the network 105. Examples of nodes include but are not limited to personal computers, laptop computers, server computers, mobile devices (such as tablet computers or mobile phones), specialized computers or systems (such as medical computing systems, financial computing systems, databases, and the like), network computing systems (such as routers, switches, firewall computing systems, and the like), web service endpoints, databases, or any other suitable computing system. Each node includes a node configuration that describes one or more properties or characteristics of the node, for instance the hardware configuration of the node (such as the identity, type, brand, properties, or capabilities of one or more hardware components or mounts of the node), the software configuration of the node (such as the identity or version of one or more applications installed on the node, patches or hot fixes installed on the node, files stored at the node, application settings or configurations, scheduled tasks, groups to which the node belongs, packages or services installed at or corresponding to the node, inventory items corresponding to the node, registry keys corresponding to the node, and the like), the operating system configuration of the node (such as the identity or version of the operating system, the identity or version of operating system patches or components, operating system services, operating system configurations or settings, and the like), the networking configuration of the node (such as ports, network interfaces, environment variables, routes, one or more node communicative configurations or settings, one or more security configurations or settings, access control lists or "ACLs" corresponding to the node, and the like), and properties or characteristics corresponding to one or more users of the node. As used herein, each property or characteristic of a node is referred to as a "node object", "node attribute", or simply an "attribute". In some embodiments used herein, node objects or node attributes are limited to node software or firmware components, such as applications, patches, hot fixes, files, drivers, and the like.

The network 105 can be any suitable network, such as the Internet, a LAN, a MAN, a WAN, a mobile wired or wireless network, a private network, a virtual private network, a direct communication line, and the like. The network can also be a combination of multiple different networks of the same or different types.

The operator node 100 includes an interface module 120, a scan engine 130, a policy engine 140, a policy storage module 150, a configuration engine 160, and a configuration storage module 170. In some embodiments, the operation node can include different or additional components than those illustrated in the embodiment of FIG. 1.

The interface module 120 provides the communicative interface between the operator node 100, the modules of the operator node, the one or more nodes 110, and a user of the operator node. The interface module requests information (such as configuration information) from the nodes 110, for instance in response to a request by the scan engine 130. The interface module receives the requested information, and provides it to one or more other modules or displays it, for instance to a user of the operator node. The interface module can provide a policy to a node 110, can provide requests to a node to configure the node according to the policy, and can generate one or more user interfaces to display policy or configuration information, for instance the differential visualizations described below. The interface module can receive input from a user, can provide received inputs to one or more other modules of the operator node or a node 110, and can store policy information and node configuration information (for instance in the policy storage module 150 or the configuration storage module 170, respectively).

The scan engine 130 is configured to scan each of one or more nodes 110 to identify a node configuration and/or node objects installed at the node. In some embodiments, the scan engine scans nodes in response to a request by a user of the operator node 100, in response to a request by the policy engine 140 (to generate or implement a policy), or in response to the passage of a pre-determined period of time (for instance, a periodic scan in order to ensure policy compliance or to gather information about the state of a node over time). In some embodiments, the scan engine simply requests each node to scan itself and provide configuration information and/or information associated with node objects installed at the node, while in other embodiments, the scan engine performs the scan at the node. In some embodiments, the scan engine scans all objects installed at the node, while in other embodiments, the scan engine scans only a pre-determined subset of node objects, for instance objects identified by a node policy.

The policy engine 140 generates and/or implements a node policy for one or more nodes 110. As used herein, "policy" can refer to an identification of a node configuration and/or one or more node objects. Further, a policy can include a set of tests to test for the presence or absence of the identified node configuration or node objects. As used herein, the generation of a node policy refers to the creation of a policy based on an identified or selected node configuration and/or node objects. As used herein, the implementation of a node policy refers to the application of the node policy to a node to identify compliance with the node policy, for instance to determine if the node includes a node configuration and/or node objects identified by the node policy. The implementation of a node policy can further include the configuration of a node based on the node policy, for instance by configuring the node into a node configuration identified by the node policy, and/or to install one or more node objects identified by the node policy. It should be noted that in some embodiments, a node policy can identify a node configuration and/or node objects to exclude. For instance, a policy can identify a software patch to exclude, and implementing such a policy can involve testing for the absence of the identified patch and/or the removal of the identified patch.

The policy engine 140 identifies, for one or more nodes 110, a node configuration of each node and/or node objects installed at each node, for instance by scanning the one or more nodes via the scan engine 130. The policy engine creates a policy based on one or more of: a node configuration, node objects installed at each node, user input identifying one or more objects to include within the policy, a role of a user, or any other suitable information. For instance, the policy engine can identify a set of objects installed at the node (such as software components, hot fixes, patches, and files), can display the identified set of objects to a user, and can receive a selection of a subset of the objects by the user. The policy engine can then generate a policy identifying the selected subset of objects. The policy can be stored in the policy storage module 150 for subsequent use and application. It should be noted that in some embodiments, the policy engine can generate a policy without identifying a node configuration or objects stored at a node. For example, a user of the operator node 100 can select a node configuration or node objects from a pre-generated list of objects presented by the policy engine via the interface module, and can generate a policy based on the selected node configuration or node objects.

Each policy identifies a set of selected node objects, and can include one or more scripts or executable programs configured to test for the presence or absence of the set of selected node objects. Each object identified by a policy can be classified within the policy based on an object type (for instance, an object can be classified as a "patch" or a "driver"), based on an operating system associated with a node (for instance, "OSX" vs. "Windows" vs. "Linux"), based on a hardware type or build associated with the node (for instance, "Cisco" vs. "Juniper"), or based on any other suitable object characteristic or property. Further, each object can be classified as "include" or "exclude" to indicate whether to test for the inclusion or exclusion of a particular object.

In some embodiments, policies also include scripts or executables configured to automate the configuration of a node to include or exclude objects identified by a policy. For instance, a policy can include a set of scripts each configured to install one or more identified objects on a target node. Beneficially, this automates the configuration of a new node included within the network to include a set of objects identified by a particular user as essential for operation within the network, for installation and operation of a particular application, and the like.

In some embodiments, policies can be written in universal languages (such as Ruby, C, and the like), and can identify universal objects (for instance, a particular hot fix for an application). Alternatively, policies can be written in a domain specific language ("DSL"), and can identify domain-specific objects. For instance, a policy generated for a particular server can be written in a proprietary language specific to the server, to the manufacturer or brand of the server, and the like. Similarly, the objects identified by a policy can be domain-specific objects. For instance, a web browser patch for an OSX or iOS machine may be different than a corresponding patch for a Windows machine. Accordingly, the identification of such a patch in a policy may be specific to a particular node configuration.

In order to test a target node for compliance with a policy written in a particular DSL, or to configure a node based on the policy, the policy can be mapped from the DSL to a universal language, or to a DSL corresponding to the target node. Likewise, in order to test a target node for compliance with a policy written in a universal language, the policy can be mapped to a DSL corresponding to the target node. As used herein, such policy mappings are referred to as the mapping of a policy from a first domain to a second domain. To map a policy from a first domain to a second domain, a universal mapping of corresponding objects can be queried for each object in the first domain identified by the policy to identify a corresponding object in the second domain. The universal mapping can map a particular object in a first domain to corresponding objects in each of one or more additional domains. For example, for a particular iOS file corresponding to a security application, the universal mapping can map corresponding Windows and Linux files to the iOS file. Similarly, for each test and automation script or executable in the first domain within the policy, a corresponding script or executable can be generated in the second domain. In some embodiments, the universal mapping is stored at the operator node 100, while in other embodiments, the mapping is stored at another entity within the environment of FIG. 1 or external to the environment of FIG. 1. It should be noted that in some embodiments, instead of a universal mapping, one or more domain-to-domain mappings (mappings from a first domain to a second domain) can be queried to map a policy to a different domain.

Once the policy is mapped from the first domain to the second domain corresponding to the target node, the mapped policy can be applied to the target node. For instance, the target node can be scanned, and the mapped policy can be used to identify whether the target node includes the objects identified by the target node. Likewise, if the policy includes test scripts or executables configured to test for the presence or absence of identified objects, the mapped scripts or executables can be run to test for the presence or absence of objects mapped to the identified objects at the target node. If the policy includes automation scripts or executables configured to configure a target node to include identified objects, the mapped automation scripts or executables can be run to configure a target node to include mapped objects.

The configuration engine 160 is configured to configure one or more nodes within the environment of FIG. 1 based on one or more policies. In embodiments where a policy includes automation scripts or executables configured to configure a target node, the configuration engine can run the automation scripts or executables to configure the target node, for instance automatically or in response to a request by a user of the operator node 100. In embodiments where a policy does not include such automation scripts or executables, the configuration engine can configure a target node by generating and running such automation scripts and executables, by providing a list of the objects identified by the policy to the target node to enable the node to self-configure based on the identified objects, by providing the list of identified objects to a network administrator or manager to enable the administrator or manager to configure the target node, or based on any other suitable method. In embodiments where a target node is within a different domain or is associated with a different DSL than a policy, the configuration engine can map the policy to the domain or DSL associated with the target node before configuring the target node. In some embodiments, the configuration engine is configured to test a target node for compliance with a policy by scanning the target node to identify a configuration of the target node and by identifying configuration differences between the target node and the policy (such as a list of objects identified by the policy that are not installed at the target node). In some embodiments, the configuration engine can store configuration information associated with scanned nodes within the configuration storage module 170.

In some embodiments, the configuration module 160 can, upon scanning a target node to test for compliance with a policy, display (via the interface module 120) the objects identified by the policy and an indication of which of the identified objects are installed at the target node and which of the identified objects are missing from the target node. In some embodiments, such a display can be configured as a delta between the configuration of the target node and the policy, for instance by displaying a list of objects identified by the policy and missing from the target node, or by displaying objects identified by the policy and installed at the target node in a first color and displaying objects identified by the policy and not installed at the target node in a second color. In some embodiments, compliance with a policy and multiple nodes can be displayed, for instance by illustrating the objects identified by the policy and missing from the configuration of each of the nodes within a single interface or display. In such embodiments, the visualization of the compliance of multiple nodes with a policy can be layered such that a user can visualize compliance at a high level (such as at an environment or data center level for multiple nodes), down through medium and low levels (such as node groups and individual nodes). In some embodiments, compliance and non-compliance at each level is displayed with different colors (for instance, compliance and non-compliance for particular objects at an environment level can be displayed with a first and second color, respectively, and compliance and non-compliance at a node group level can be displayed with a third and fourth color, respectively).

In some embodiments, the configuration module 160 can configure multiple nodes simultaneously or substantially simultaneously using a particular policy. In such embodiments, the configuration module 160 can identify, for each of the multiple nodes, a set of objects identified by the policy and not installed at the node, and can install the identified set of objects at the node. In some embodiments, a node can be configured with multiple policies. For instance, a first policy corresponding to (for example) security objects can be used to configure a target node, and a second policy corresponding to (for example) networking objects can be used to configure the target node. In such embodiments, the security objects identified by the first policy can be different than the networking objects identified by the second policy, and thus the target node can be configured according to both policies simultaneously.

Figure 2:
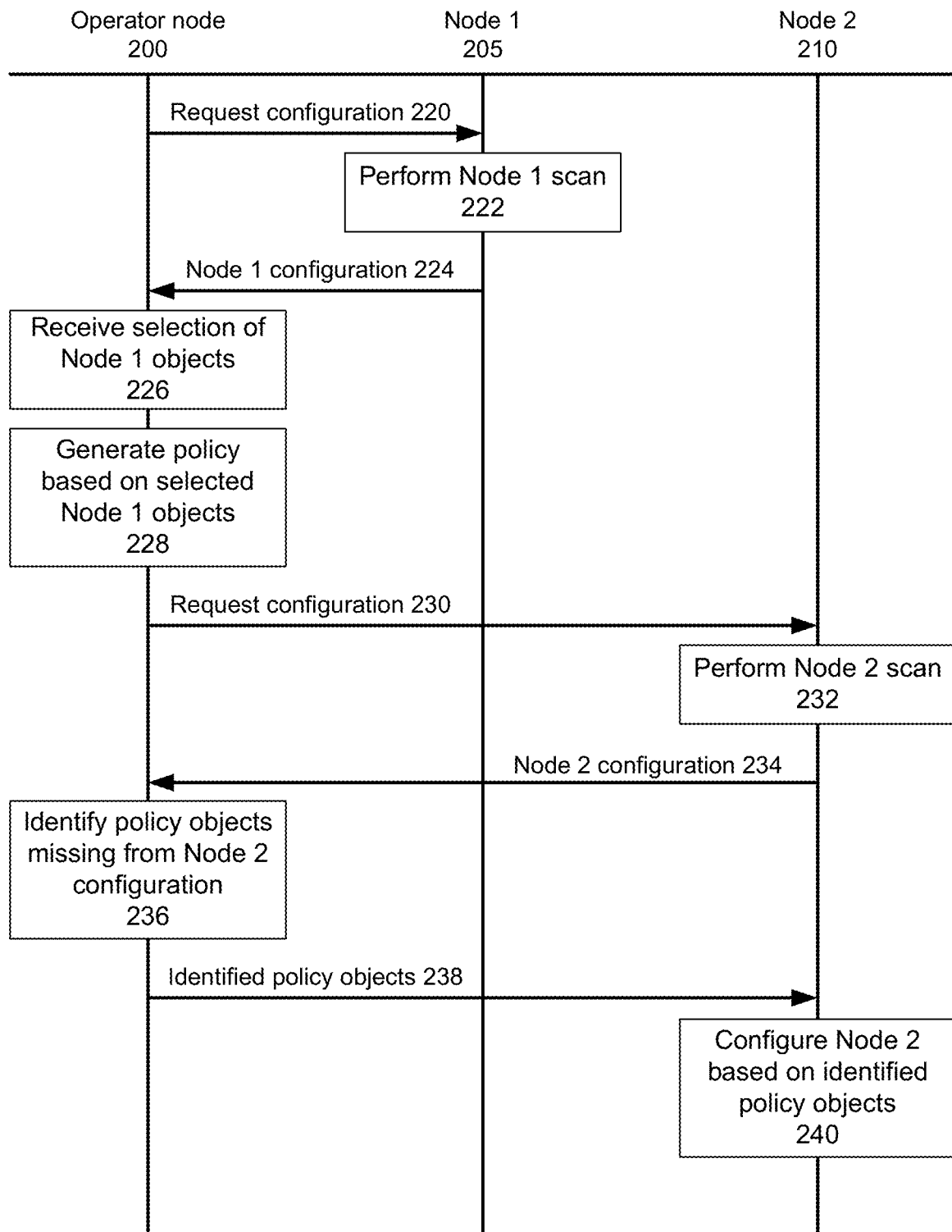
FIG. 2 is an interaction diagram illustrating the generation of a node policy and the configuration of a node based on the policy, according to one embodiment.

FIG. 2 is an interaction diagram illustrating the generation of a node policy and the configuration of a node based on the policy, according to one embodiment. In the embodiment of FIG. 2, an operator node 200, a first node ("Node 1") 205, and a second node ("Node 2") 210 interact within a network. The operator node 200 sends a request 220 for configuration information to Node 1. A scan of Node 1 is performed 222 in response to the request to determine the configuration of Node 1 (such as the objects installed at Node 1). The configuration information 224 of Node 1 is provided to the operator node, which receives 226 a selection of objects installed at Node 1, for instance from a user or network administrator/manager. A policy is then generated 228 by the operator node based on the selected Node 1 objects.

The operator node 200 sends a request 230 for configuration information to Node 2. A scan of Node 2 is performed 232 (for instance, to identify objects installed at Node 2), and the resulting configuration information 234 of Node 2 is provided to the operator node. The operator node identifies 236 objects identified in the policy that are missing from the Node 2 configuration (e.g., objects identified in the policy that are not installed at Node 2). The identified policy objects 238 missing from the configuration of Node 2 are provided to Node 2, and Node 2 is configured 240 based on the identified policy objects (for instance, by installing the identified policy objects at Node 2). It should be noted that in some embodiments, if Node 2 is a new node being added to a network, instead of scanning Node 2 to identify policy objects missing from the configuration of Node 2, a list of all objects identified by the policy can be provided to Node 2, and Node 2 can be configured to include the list of objects.

Figure 3:
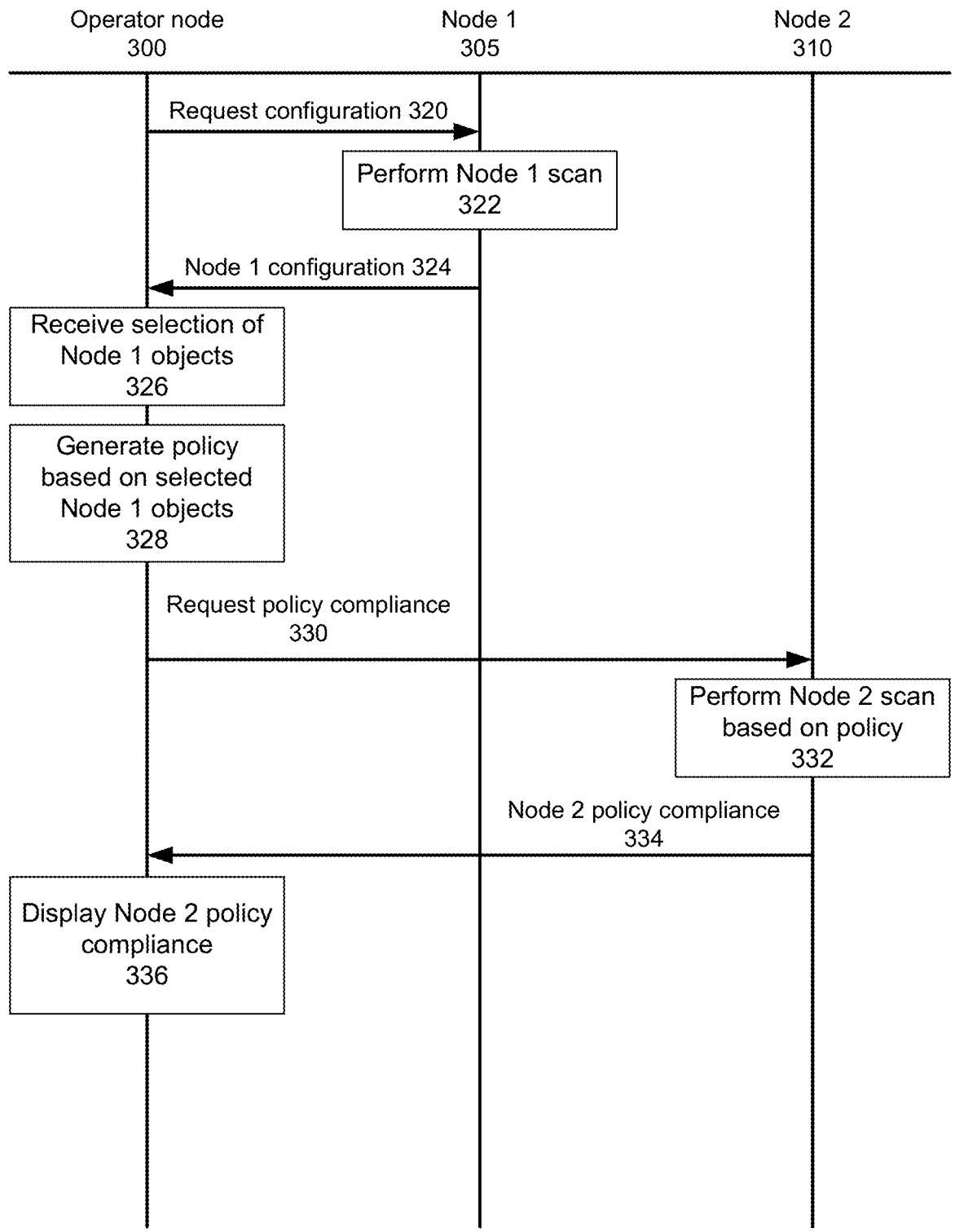
FIG. 3 is an interaction diagram illustrating the generation of a node policy and the testing of a node for compliance with the policy, according to one embodiment.

FIG. 3 is an interaction diagram illustrating the generation of a node policy and the testing of a node for compliance with the policy, according to one embodiment. In the embodiment of FIG. 2, an operator node 300, a first node ("Node 1") 305, and a second node ("Node 2") 310 interact within a network. The operator node sends a request 320 for configuration information to Node 1, a scan of Node 1 is performed 322, and configuration information 324 describing the configuration of Node 1 is provided to the operator node. A selection of Node 1 objects is received, and a policy is then generated 328 by the operator node based on the selected Node 1 objects.

The operator node 300 requests 330 a policy compliance determination of Node 2 in view of the generated policy. A scan of Node 2 is performed 332 based on the policy. For instance, Node 2 is scanned to identify the presence or absence of objects identified within the policy. Policy compliance information 334 describing the compliance of Node 2 with the policy is provided to the operator node, and the operator node displays 336 the policy compliance information. For instance, the operator node can identify objects identified within the policy but missing from the configuration of Node 2, and can display a user interface illustrating the identified missing objects to a user of the operator node (such as a network manager or administrator).

Figure 4:
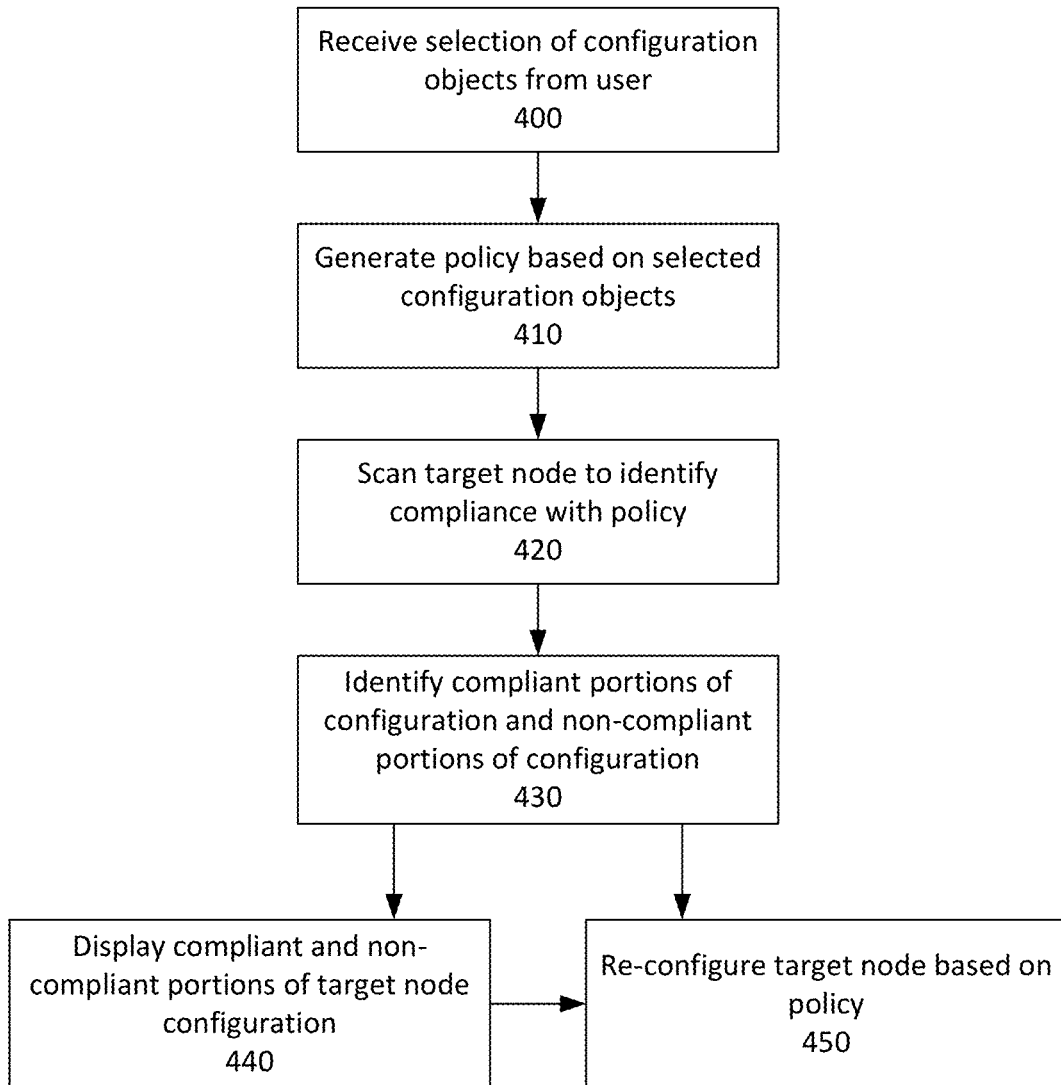
FIG. 4 is a flowchart illustrating the generation and implementation of a node policy, according to one embodiment.

FIG. 4 is a flowchart illustrating the generation and implementation of a node policy, according to one embodiment. A selection of configuration objects is received 400 from a user. For instance, a set of files, hot fixes, patches, and drivers can be selected by a network manager or node configuration application. A policy is generated 410 based on the selected objects. A target node is subsequently scanned 420 to identify compliance with the policy. Compliant portions of the target node configuration (for instance, objects identified by the policy and installed at the target node) and non-compliant portions of the target configuration (for instance, objects identified by the policy but not installed at the target node) are identified 430. One or more of the identified compliant and non-compliant portions of the target node configuration are displayed 440. For instance, the objects identified by the policy and not installed at the target node can be graphically displayed within a user interface to a user. The target node is reconfigured 450 based on the policy, by installing objects identified by the policy and not currently installed at the target node.

Differential Visualization for Multiple Nodes

In some embodiments, the operator node 100 provides via its interface 120 one or more visualizations by which a user (or "operator") can monitor the status of one or more nodes in the network. This visualization can be organized in multiple ways. One such visualization, known as a differential visualization, provides an aggregate view of the state and/or configuration of all or some of the target nodes in a network. Each of the target nodes which make up the network can share a common set of node objects or attributes. These attributes, as described previously, are discrete pieces of information describing a property of one or more node objects in a target node. Some attributes may be similar or identical across target nodes—for example, all nodes are associated with an operating system (OS) running on the node (e.g., Ubuntu, Windows, etc.). Other attributes, such as the amount of available memory on the target node or the presence of one or more connected devices, may vary widely across target nodes. It is useful for a manager or administrator of the network to view attribute information across all or some of the target nodes in the network and be able to identify similarities and differences between configurations or states of the target nodes.

Figure 5:
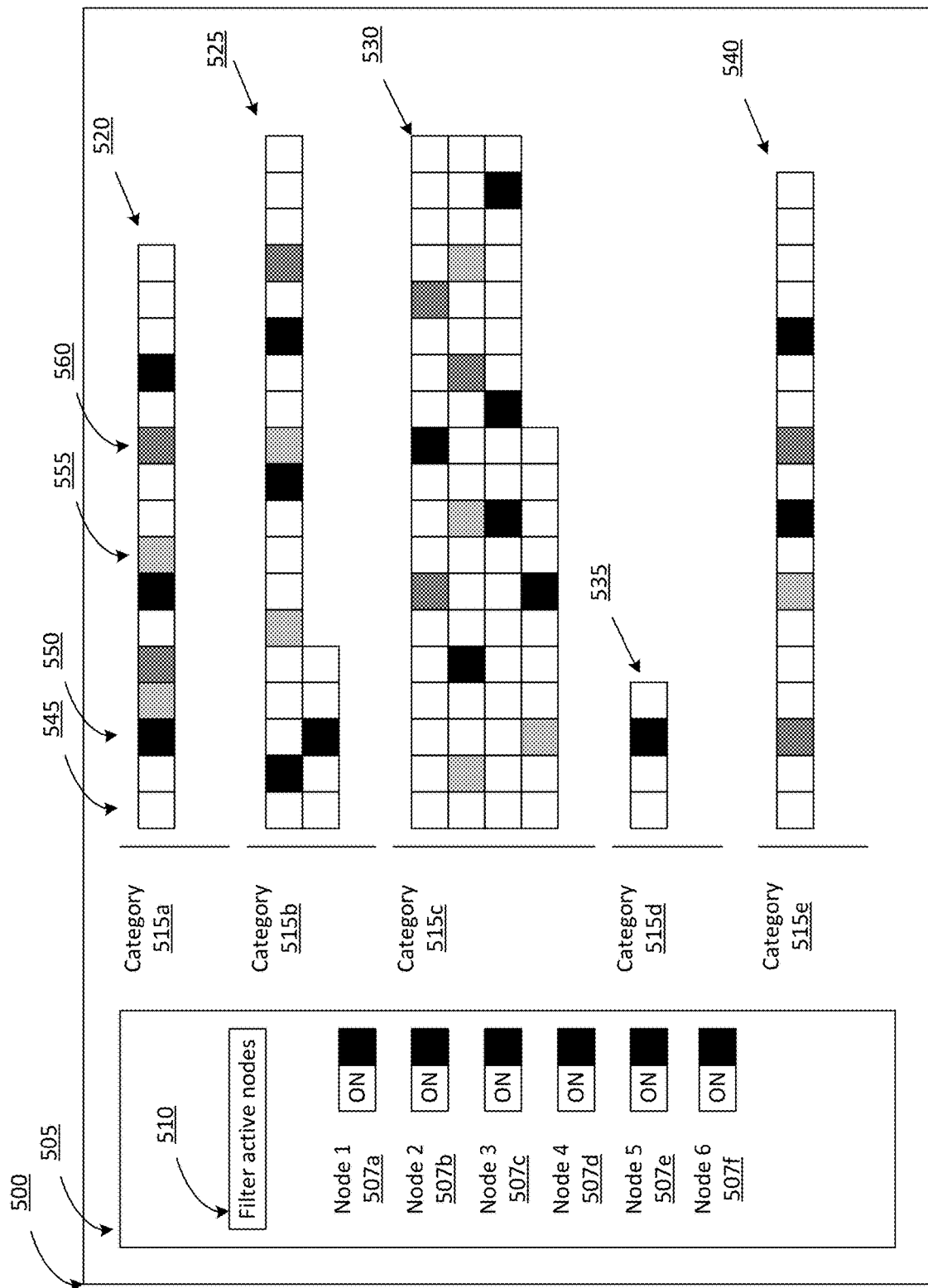
FIG. 5 illustrates a differential visualization at a single point in time, according to one embodiment.

FIG. 5 illustrates a differential visualization at a single point in time, according to one embodiment. The environment 500 includes a filter menu 505, which displays a list of target nodes 507*a*, 507*b*, 507*c*, 507*d*, 507*e*, and 507*f* These nodes 507*a-f*, and the attributes included therein, form the basis of the differential visualization. The filter menu 505 further includes a filter box 510 in which a user can enter search terms relevant to one or more target nodes in order to narrow down the list of nodes displayed in the differential visualization.

Attributes pertaining to each of the displayed nodes are organized into categories. Attributes can be organized into categories based on any suitable criteria. Example categories include "Hardware", "Ports", and "Files". In the depicted embodiment, five categories—Category 515*a*, Category 515*b*, Category 515*c*, Category 515*d*, and Category 515*e*—are displayed. Each category is associated with a set of attributes. Each set of attributes corresponding to a category is displayed as a collection of tiles adjacent to the corresponding category label. In the depicted embodiment, attribute set 520 corresponds to Category 515*a*, attribute set 525 corresponds to Category 515*b*, attribute set 530 corresponds to Category 515*c*, attribute set 535 corresponds to Category 515*d*, and attribute set 540 corresponds to Category 515*e*.

Each attribute in an attribute set is represented by a tile. A tile conveys a differential visualization of the attribute corresponding to the tile for each of the nodes included in the visualization. In one embodiment, the value of each attribute may be identified and stored for each node included in the visualization. Based on these values, a variance value may be computed that describes the amount of dissimilarity for that particular attribute across the set of nodes. The magnitude of the variance may be presented to the user via use of a color-coded scheme. In the example of FIG. 5, attribute 545 is white, indicating little to no variance between the nodes 507*a-f* with regards to attribute 545 (e.g., the value of attribute 545 for each of nodes 507*a-f* is the same or similar). Attribute 550 is black in the visualization of FIG. 5, indicating a high variance between the values of the attribute 550 for each of nodes 507*a-f*. Intermediate levels of opacity may be displayed using varying levels of grayscale. For example, attribute 555 is light gray, corresponding to a low to moderate level of variance for attribute 555, and attribute 560 is dark gray, corresponding to a medium to high level of variance for attribute 560.

In some embodiments, discrete levels of variance may be conveyed using tiles depicted according to various patterns. Various types of shading, crosshatching, and the like may be used to distinguish between discrete levels of variance. In still another embodiment, variance may be depicted by icons instead of by colors or patterns. For example, each attribute in an attribute set may be represented by a circular tile. The radius of the circular tile may indicate the level of variance of the attribute, with small radii indicating little to no variance and large radii indicating high variance. In another example implementation, variance measures may be represented by text icons. In this scheme, little to no variance is labeled with an "L", moderate variance is labeled with an "M", and high variance is labeled "H".

It should be noted that the tiles displayed in the embodiment of FIG. 5 and the other embodiments described herein can be selected by a user or operator. In response to being selected, information representative of the attribute corresponding to the selected tile can be displayed. For instance, in the embodiment of FIG. 5, when a user selects the tile corresponding to the attribute 550, the values of the attribute 550 for each of nodes 507*a*-507*f* can be displayed. For example, an identifier representative of node 507*a* can be displayed, and a value for the attribute 550 for the node 507*a* can be displayed adjacent to the identifier—similar identifiers can be displayed for nodes 507*b*-507*f*. Continuing with this example, a user or operator can subsequently select a node, and can configure the attribute 550 of the remaining nodes to match the value of the attribute of the selected node.

Time-Varying Differential Visualization for Multiple Nodes

Because the configuration status of each node in a network can change over time, it is useful for managers or administrators of the network to view the change in configuration of the nodes over time. In one embodiment, the differential visualization described above can be extended to enable the display of the differential visualization of the nodes over time. In such embodiments, an operator can toggle a timeline corresponding to the visualization such that, for a selected time, a snapshot of the differential visualization of the nodes in the network at the selected time can be presented.

Figure 6A:
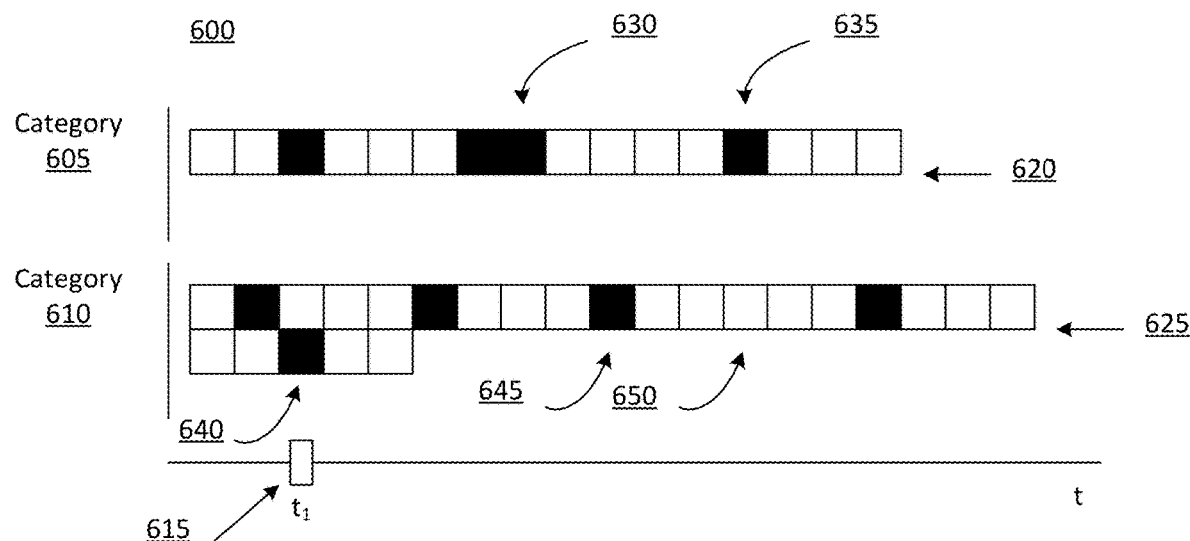
FIGS. 6a and 6b illustrate a time-varying differential visualization viewed at two different times, according to one embodiment.
Figure 6B:
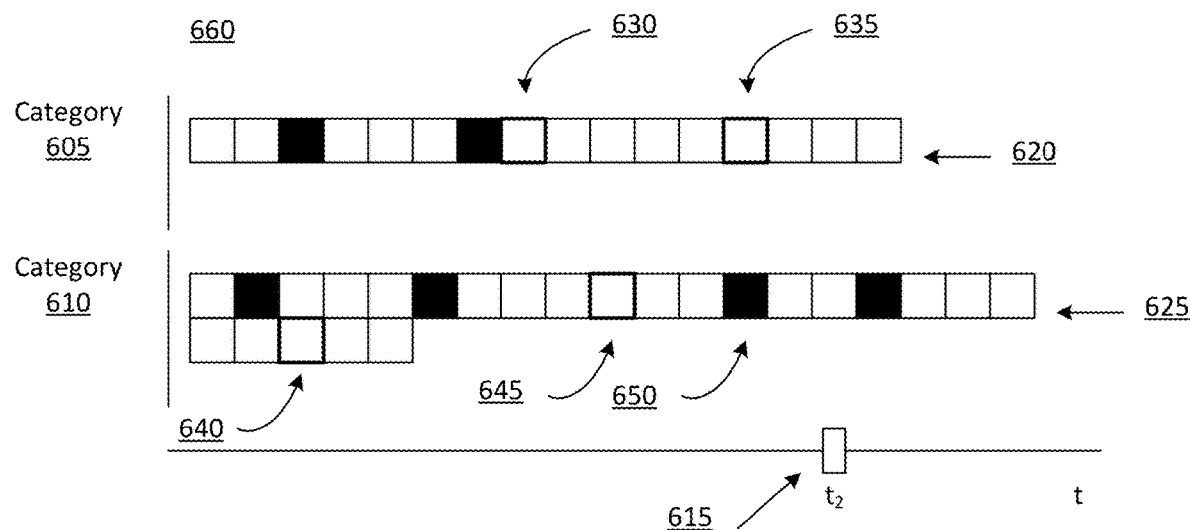

FIGS. 6*a* and 6*b* illustrate a time-varying differential visualization viewed at two different times, according to one embodiment. The environment 600 of FIG. 6*a* contains two categories, Category 605 and Category 610. A time slider bar 615 below Category 610 indicates that the visualization depicts the differential visualization of Category 605 and 610 at a time $t_1$. Category 605 and Category 610 correspond to attribute sets 620 and 625 respectively. Selected tiles 630, 635, 640, 645, and 650 are labeled for emphasis.

The environment 660 of FIG. 6*b* contains the same two categories, Category 605 and Category 610. The time slider bar 615 in the embodiment of FIG. 6*b* is moved to time $t_2$, subsequent to $t_1$. The same selected tiles 630, 635, 640, 645, and 650 are labeled for emphasis.

Comparing FIGS. 6*a* and 6*b*, it is apparent that some of the labeled tiles change color between times $t_1$ and $t_2$. As described previously, a change in the color of a tile indicates a change in the variance of the attribute represented by the tile. In the embodiment depicted in FIGS. 6*a* and 6*b*, black indicates high variance and white indicates low variance. Accordingly, tiles 630, 635, 640, and 645 reflect high variance in FIG. 6*a* and low variance in FIG. 6*b*. Tile 650 reflects low variance in FIG. 6*a* and high variance in FIG.

6b. Changes in variance depicted in the embodiments of FIGS. 6a and 6b represent only a subset of the possible changes in variance that may be observed by a viewer of the visualization when switching between times $t_1$ and $t_2$. The measure of variance for a particular attribute may increase, decrease, or stay the same between different times.

As noted earlier, FIGS. 6a and 6b depict only one embodiment of a temporal differential visualization. Alternate embodiments may make use of color-coded or gray-scale tiles, allowing for a more detailed differential visualization than that of FIGS. 6a and 6b.

Event-Focused Differential Visualization for Multiple Nodes

Individual nodes in a network can unpredictably enter into a state of policy non-compliance. One reason a node can enter a non-compliant state includes inadvertent changes to a node, either with or without the involvement of a network administrator, that cause it to violate one or more aspects of a node policy. In large, complex networks, especially those configured to perform critical business functions, policy failures can be highly damaging.

In a typical embodiment, individual policy violations are identified by the scan engine 130 of the operator node 100 of a network. The scan engine 130 may periodically scan each of the nodes in the network and generate a differential visualization based on the results of the scans. The scan engine 130 can compare the configuration of each node against policy information contained in the policy database 150, or provided by the policy engine 140, and can identify the attributes of non-compliant nodes that are in violation of the policy. In one embodiment, the policy engine 140 or the configuration engine 160 may define a violation severity threshold. If the aggregate severity of one or more individual violations of the policy exceeds the severity threshold, the policy engine 140 or configuration engine 160 may then designate a "policy failure" event. This event is considered unusual or serious enough to warrant manual inspection by an administrator of the network.

Within a particular network of nodes, multiple policy failure events may share common characteristics. For example, each of the policy failure may be triggered by policy violations in a select group of attributes for a select group of nodes. This type of commonality is traditionally difficult to identify because it requires network administrators to manually inspect server log files.

Figure 7:
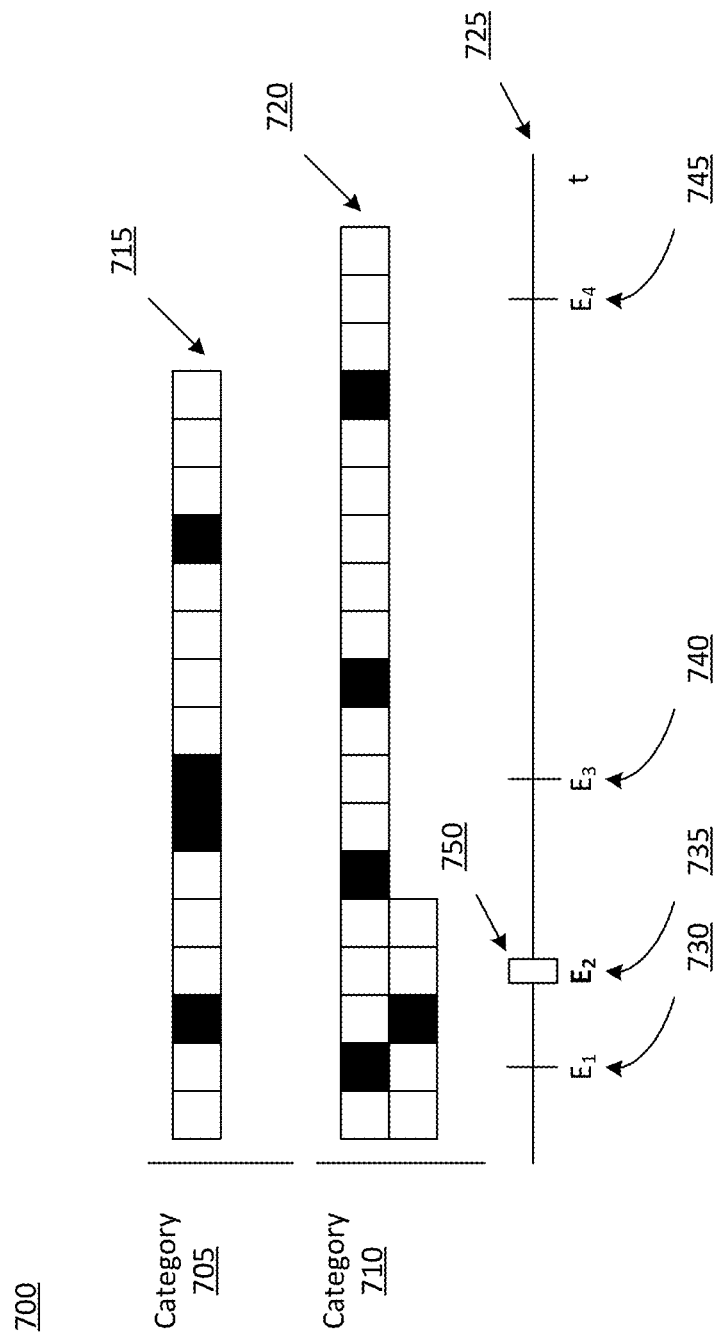
FIG. 7 illustrates a differential visualization of each of a series of policy failure events, according to one embodiment.

FIG. 7 illustrates a differential visualization of each of a series of policy failure events, according to one embodiment. The environment 700 of FIG. 7 contains two categories, Category 705 and Category 710, corresponding to sets 715 and 720 respectively. A timeline 725 is displayed below Category 710. Four events $E_1$ 720, $E_2$ 735, $E_3$ 740, and $E_4$ 745 are marked on the timeline. Each of the events $E_1$, $E_2$, $E_3$, and $E_4$ represents instances of a policy failure involving one or more of the nodes in the network, each at a particular time. The user can manipulate a slider bar 750 to view each of the events $E_1$, $E_2$, $E_3$, and $E_4$. In the embodiment of FIG. 7, the slider bar 750 is moved to event $E_2$, and the differential visualization for attributes within categories 705 and 710 at the time corresponding to the event $E_2$ is displayed. For each event, a differential view of node configurations is displayed. The user can compare the attribute variance at a particular event in order to identify whether the status of one or more of the attributes is associated with the policy failure events. The user can then take appropriate steps to modify the configuration of one or more nodes in order to mitigate the severity of subsequent policy failure events, or avoid them altogether.

Node-Specific Visualization

In certain situations, it may be useful for an administrator of a network to view individual changes occurring in each of the nodes contained within the network. In previously described embodiments, users are only able to view differential information based on categories or attributes common across individual nodes. These visualizations only permit an aggregate view of similarity or dissimilarity across node configurations. It would be further beneficial to enable a user to view the configuration of each node over time in isolation.

Figure 8:
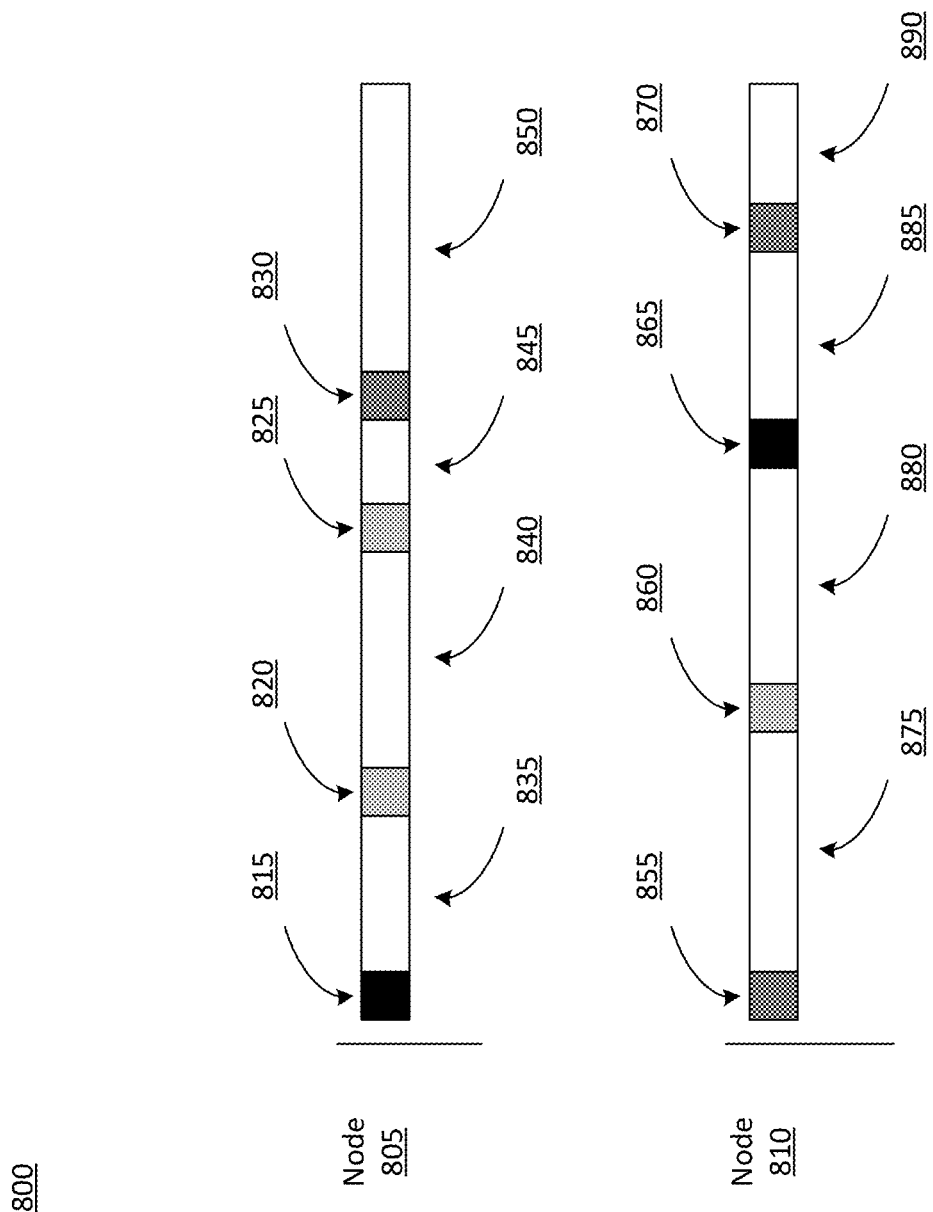
FIG. 8 illustrates a node-specific configuration visualization, according to one embodiment.

In a node-specific visualization, information associated with a particular node in a network is displayed individually. For each node, the user is able to view the attributes associated with that node. For ease of understanding, the attributes may be organized into one or more categories as described previously. Since nodes may have hundreds or even thousands of attributes, the visualization displays each node as a collection of categories, instead of a collection of attributes FIG. 8 illustrates a node-specific configuration visualization, according to one embodiment. The environment 800 includes two sample nodes, Node 805 and Node 810. Each node includes multiple categories. Each individual category is represented by a tile. Node 805 contains categories 815, 820, 825, and 830. Likewise, Node 810 contains Categories 855, 860, 865, and 870. Each category tile is accompanied by a rectangular bar. The length of the bar represents the size of the category—in other words, how many attributes it contains. For Node 805, Bar 835 corresponds to Category 815, Bar 850 corresponds to Category 820, Bar 845 corresponds to Category 825, and Bar 850 corresponds to Category 830. Likewise, for Node 810, Bar 875 corresponds to Category 855, Bar 880 corresponds to Category 860, Bar 885 corresponds to Category 865, and Bar 890 corresponds to Category 870.

In the example embodiment of FIG. 8, each individual category can be displayed in different colors. Each color indicates one type of change made to one or more attributes in that category. For example, in one embodiment, a category to which one or more attributes were added may be colored blue, a category in which one or more attributes were modified may be colored yellow, and a category in which one or more attributes were removed may be colored grey. Further, the opacity of the displayed colors may also be varied in order to convey further information to the user. For example, more recent changes may be represented by strong colors—in other words, the color of the category tile is highly opaque. As the change becomes less recent, the color of the tile may become less opaque and appear more faded. The intended effect of this visualization technique is to make it easy for a user to observe how attributes in a given node are changing, and when those changes are happening.

Additional Configuration Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for configuring one or more target nodes communicatively coupled to an operator node in a network comprising:
   generating, by the operator node, a differential visualization interface for display by a hardware display and illustrating 1) a difference between a first set of system attributes of a first node at a current time and at a previous time and 2) a second set of system attributes of the first node common between the current time and the previous time, the differential visualization interface including a slider bar interface element that enables a user to select the previous time from a plurality of previous times and organizing displayed system attributes into categories comprising at least hardware attributes, port attributes, and file attributes that are associated with a set of system attributes;
   in response to receiving from the user, at the operator node, a selection of the previous time from the plurality of previous times via the slider bar interface element, modifying the differential visualization interface to indicate 1) the first set of system attributes of the first node different between the current time and the selected previous time and 2) the second set of system attributes of the first node common between the current time and the selected previous time, and to highlight, for each of the first set of system attributes, a variance representative of an amount of dissimilarity of the attribute between the first node and a plurality of additional nodes at the selected previous time within an icon displayed in the interface associated with the attribute, the differential visualization interface allowing a selection request of a non-zero variance displayed within the differential visualization, the non-zero variance associated with a system attribute of the first set of system attributes and the second set of system attributes;
   in response to receiving the request from the user, at the operator node, re-configuring one or more attributes of the first node identified based on the variance of the attributes as responsible for a policy failure event by re-configuring the requested system attribute to mirror a target system attribute of the first set of system attributes and the second set of system attributes, wherein the target system attribute does not cause a policy failure event; and
   in response to re-configuring one or more attributes of the first node, updating, by the operator node, the displayed differential visualization to indicate a change in variance associated with the system attribute from the non-zero variance to a zero variance.

2. The method of claim 1, wherein the differential visualization interface indicates a high variance between values of a system attribute using a first indicator and a low variance between values of the system attribute using a second indicator different from the first indicator.

3. The method of claim 2, wherein the first indicator comprises a first color and wherein the second indicator comprises a second color.

4. The method of claim 2, wherein the first indicator comprises a first icon type and wherein the second indicator comprises a second icon type.

5. The method of claim 1, wherein the differential visualization interface further indicates a violation of a configuration policy associated with one or more of the system attributes at one or both of the current time and the selected previous time.

6. The method of claim 5, wherein the differential visualization interface further indicates a severity of the violation of the configuration policy.

7. The method of claim 1, wherein the request from the user is received via a second interface element displayed within the differential visualization interface.

8. A non-transitory computer-readable storage medium storing executable computer instructions that, when executed by a processor, cause the processor to perform steps comprising:
   generating, by the operator node, a differential visualization interface for display by a hardware display and illustrating 1) a difference between a first set of system attributes of a first node at a current time and at a previous time and 2) a second set of system attributes of the first node common between the current time and the previous time, the differential visualization interface including a slider bar interface element that enables a user to select the previous time from a plurality of previous times and organizing displayed system attributes into categories comprising at least hardware attributes, port attributes, and file attributes that are associated with a set of system attributes;
   in response to receiving; from the user, at the operator node, a selection of the previous time from the plurality of previous times via the slider bar interface element, modifying the differential visualization interface to indicate 1) the first set of system attributes of the first node different between the current time and the selected previous time and 2) the second set of system attributes of the first node common between the current time and the selected previous time, and to highlight, for each of the first set of system attributes, a variance representative of an amount of dissimilarity of the attribute between the first node and a plurality of additional nodes at the selected previous time within an icon displayed in the interface associated with the attribute, the differential visualization interface allowing a selection request of a non-zero variance displayed within the differential visualization, the non-zero variance associated with a system attribute of the first set of system attributes and the second set of system attributes;
   in response to receiving the request from the user, at the operator node, re-configuring one or more attributes of the first node identified based on the variance of the attributes as responsible for a policy failure event by re-configuring the requested system attribute to mirror a target system attribute of the first set of system attributes and the second set of system attributes, wherein the target system attribute does not cause a policy failure event; and
   in response to re-configuring one or more attributes of the first node, updating, by the operator node, the displayed differential visualization to indicate a change in variance associated with the system attribute from the non-zero variance to a zero variance.

9. The non-transitory computer-readable storage medium of claim 8, wherein the differential visualization interface indicates a high variance between values of a system attribute using a first indicator and a low variance between values of the system attribute using a second indicator different from the first indicator.

10. The non-transitory computer-readable storage medium of claim 9, wherein the first indicator comprises a first color and wherein the second indicator comprises a second color.

11. The non-transitory computer-readable storage medium of claim 9, wherein the first indicator comprises a first icon type and wherein the second indicator comprises a second icon type.

12. The non-transitory computer-readable storage medium of claim 8, wherein the differential visualization interface further indicates a violation of a configuration policy associated with one or more of the system attributes at one or both of the current time and the selected previous time.

13. The non-transitory computer-readable storage medium of claim 12, wherein the differential visualization interface further indicates a severity of the violation of the configuration policy.

14. The non-transitory computer-readable storage medium of claim 8, wherein the request from the user is received via a second interface element displayed within the differential visualization interface.

15. An operator management system comprising: a non-transitory computer-readable storage medium storing executable instructions that,
   when executed, perform steps comprising:
      generating, by the operator node, a differential visualization interface for display by a hardware display and illustrating 1) a difference between a first set of system attributes of a first node at a current time and at a previous time and 2) a second set of system attributes of the first node common between the current time and the previous time, the differential visualization interface including a slider bar interface element that enables a user to select the previous time from a plurality of previous times and organizing displayed system attributes into categories comprising at least hardware attributes, port attributes, and file attributes that are associated with a set of system attributes;
      in response to receiving; from the user, at the operator node, a selection of the previous time from the plurality of previous times via the slider bar interface element, modifying the differential visualization interface to indicate 1) the first set of system attributes of the first node different between the current time and the selected previous time and 2) the second set of system attributes of the first node common between the current time and the selected previous time, and to highlight, for each of the first set of system attributes, a variance representative of an amount of dissimilarity of the attribute between the first node and a plurality of additional nodes at the selected previous time within an icon displayed in the interface associated with the attribute, the differential visualization interface allowing a selection request of a non-zero variance displayed within the differential visualization, the non-zero variance associated with a system attribute of the first set of system attributes and the second set of system attributes;

in response to receiving the request from the user, at the operator node, re-configuring one or more attributes of the first node identified based on the variance of the attributes as responsible for a policy failure event by re-configuring the requested system attribute to mirror a target system attribute of the first set of system attributes and the second set of system attributes, wherein the target system attribute does not cause a policy failure event;

in response to re-configuring one or more attributes of the first node, updating, by the operator node, the displayed differential visualization to indicate a change in variance associated with the system attribute from the non-zero variance to a zero variance; and a processor configured to execute the instructions.

16. The operator management system of claim 15, wherein the differential visualization interface indicates a high variance between values of a system attribute using a first indicator and a low variance between values of the system attribute using a second indicator different from the first indicator.

17. The operator management system of claim 16, wherein the first indicator comprises a first color and wherein the second indicator comprises a second color.

18. The operator management system of claim 16, wherein the first indicator comprises a first icon type and wherein the second indicator comprises a second icon type.

19. The operator management system of claim 15, wherein the differential visualization interface further indicates a violation of a configuration policy associated with one or more of the system attributes at one or both of the current time and the selected previous time.

20. The operator management system of claim 19, wherein the differential visualization interface further indicates a severity of the violation of the configuration policy.

* * * * *